United States Patent

Hinkens

[11] Patent Number: 5,964,321
[45] Date of Patent: Oct. 12, 1999

[54] BALL JOINT PISTON BORE CALIPER

[75] Inventor: George H. Hinkens, Fox Point, Wis.

[73] Assignee: Hayes Brake, Inc., Mequon, Wis.

[21] Appl. No.: 08/638,526

[22] Filed: Apr. 26, 1996

[51] Int. Cl.$^6$ .................................................. B60T 11/00
[52] U.S. Cl. ........................................ 188/72.4; 188/370
[58] Field of Search ................................ 188/72.4, 73.1, 188/344, 367, 368, 369, 370, 196 A, 72.5

[56] References Cited

U.S. PATENT DOCUMENTS

| | | | |
|---|---|---|---|
| 3,361,229 | 1/1968 | Swift | 188/72.4 |
| 3,997,032 | 12/1976 | Kondo | 188/72.4 |
| 4,570,531 | 2/1986 | Anderson et al. | 188/72.4 X |
| 5,172,793 | 12/1992 | Temple et al. | 188/72.4 |
| 5,277,279 | 1/1994 | Shimura | 188/72.5 |
| 5,390,771 | 2/1995 | Hinkens et al. | 188/344 |

FOREIGN PATENT DOCUMENTS 31733  2/1986  Japan .................................... 188/72.4

Primary Examiner—Chris Schwartz
Attorney, Agent, or Firm—Foley & Lardner

[57] ABSTRACT

A caliper assembly for controlling the rotation of a brake disk, the assembly including a caliper, a piston cylinder in the caliper on each side of the disk, a piston positioned in each of the cylinders, and a flange in the open end of each of the cylinders for supporting the piston for reciprocal motion in the cylinder, a groove on the inner side of the flange for supporting a seal ring and a groove on the outer side of the flange for supporting a wiper ring, and an opening at the end of the cylinder greater than the diameter of the piston cylinder, which allows for a much greater piston to bore angularity and prevents jamming of the piston in the cylinder.

13 Claims, 4 Drawing Sheets

BALL JOINT PISTON BORE CALIPER

FIELD OF THE INVENTION

The present invention relates to disk brakes and more particularly to a piston and cylinder arrangement wherein a flange is formed on the inner circumference of the cylinder which allows for a much greater amount of piston cocking in the piston cylinder without detrimental effect.

BACKGROUND OF THE INVENTION

Brake engineers have always had to deal with uneven wear of the brake pads which causes a piston to cock in the piston bore or cylinder resulting in an unacceptable increased friction between the piston and its bore. A typical brake of the type contemplated herein is shown in U.S. Pat. No. 5,277,279, issued on Jan. 11, 1994. It should be noted that as the brake pad wears, one side of the pad is thinner than the other causing the piston to cock in the bore. The piston jams when it wedges across two sides of the bore. Engineers have typically solved the problem by increasing the length of the piston. For a given diameter, a short piston will jam, whereas a long piston will not. However, many applications require a short piston for a brake that must fit in a small space.

SUMMARY OF THE PRESENT INVENTION

The ball joint piston assembly according to the present invention is provided with an internal flange in the bore or cylinder which is located in close proximity to the open end of the bore to allow the piston to cock in the bore. The maximum pad taper a brake will ever see will cause the piston to cock on the internal flange at an angle that is less than the piston can cock before touching two sides of the bore. With this arrangement the piston will never jam in the bore.

In this regard, the disk brake assembly according to the present invention includes a caliper having side wall sections on each side of a rotary disk so as to face the side surfaces of the disk. A brake pad is disposed between each of the side wall sections of the caliper and the disk. A bore or cylinder is provided in each side wall section of the caliper with a piston slidably mounted in each of the bores. Each of the bores includes an inner section having a diameter much greater than the diameter of the piston, an internal flange having a diameter only slightly larger than the diameter of the piston and an outer section having a diameter greater than the diameter of the internal flange. A wiper seal groove is provided between the internal flange and the outer section to support a wiper seal. A piston seal groove is provided at the end of the inner section for supporting a piston seal. With this arrangement, the piston is free to cock with respect to the internal flange. The maximum pad taper the brake will ever see is less than the piston can cock.

Other principal features and advantages of the invention will become apparent to those skilled in the art upon review of the following drawings, the detailed description and the appended claims.

Figure 1:
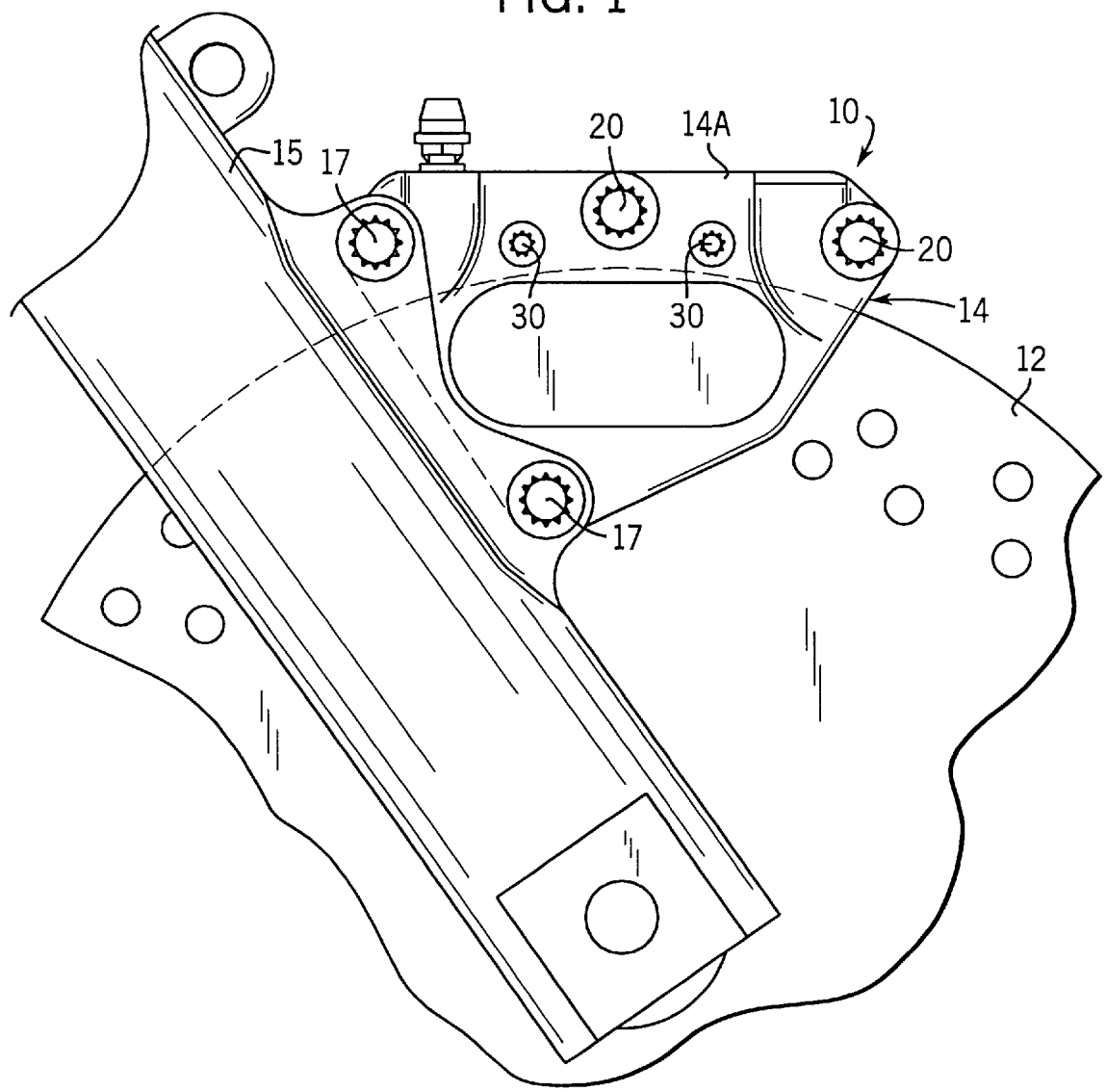
FIG. 1 is a view of a brake caliper shown mounted on a frame and bridging a brake disk.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
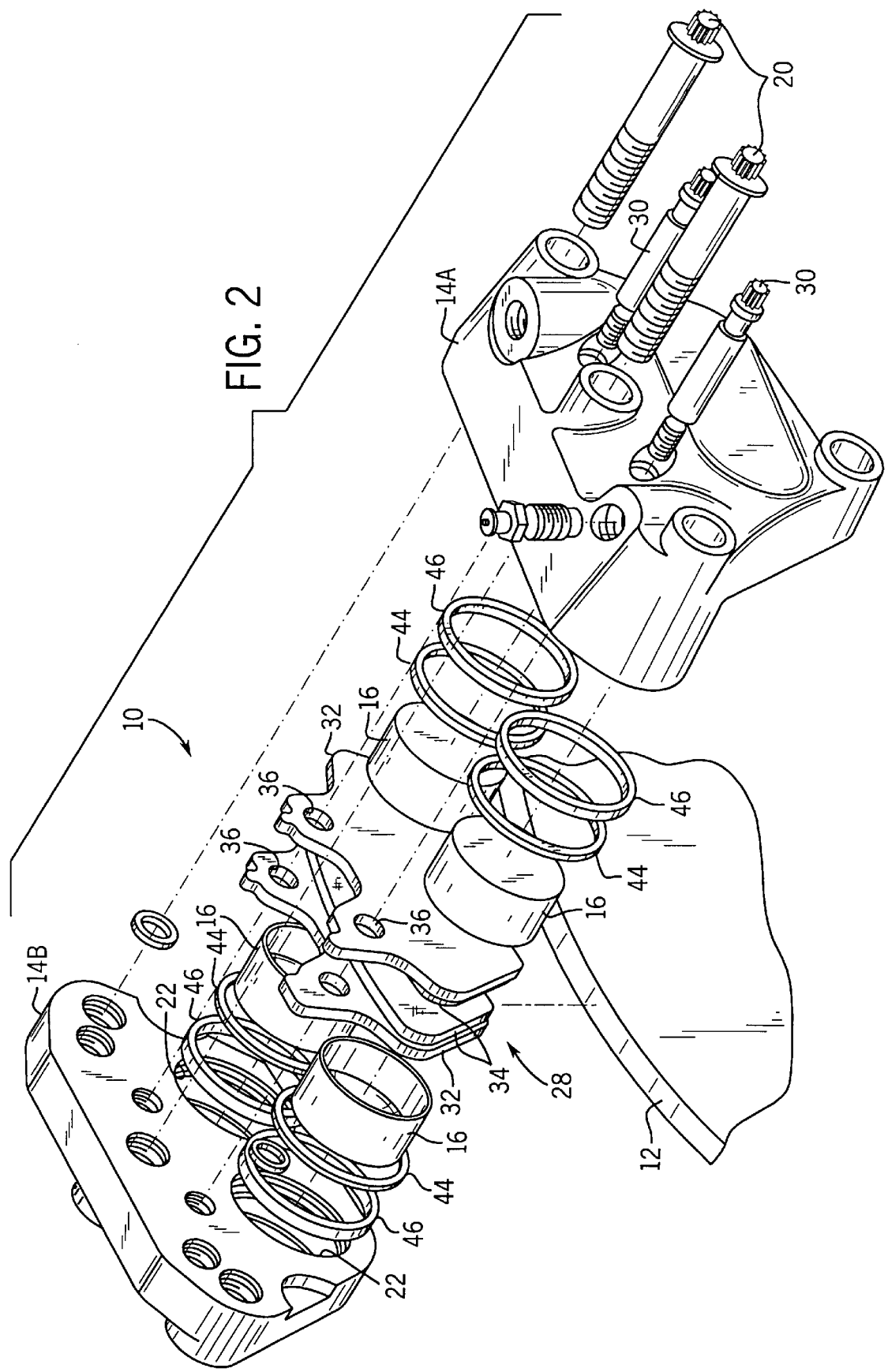
FIG. 2 is an exploded view of the caliper according to the present invention.

As shown in FIGS. 1 and 2 the disk brake assembly 10 generally includes a disk 12 and a caliper 14 which is disposed astride the disk 12. The caliper 14 is mounted on the frame 15 by means of bolts 17. The caliper 14 is an opposed piston type caliper in which pistons 16 are disposed on each side of the disk 12. The caliper 14 includes a pair of half sections 14A and 14B which are fastened together by bridge bolts 20 at bridge positions located on the outside of the periphery of the disk 12, whereby the caliper 14 straddles the disk 12.

Each of the half sections 14A and 14B is formed with two open bores or cylinders 22, respectively. The bores 22 are located at corresponding positions so that the two halves 14A and 14B can be fastened together with the corresponding bores 22 facing each other. A brake pad assembly 28 is supported on each side of the disk 12 by means of a pair of brake pad pins 30. Each pad assembly includes a plate 32 having a brake pad 34 mounted on one side of the plate 32. A pair of openings 36 are provided in each plate 32 which are aligned with and supported by the pins 30. The pistons 16 are positioned on opposite sides of the brake disk 12.

Figure 3:
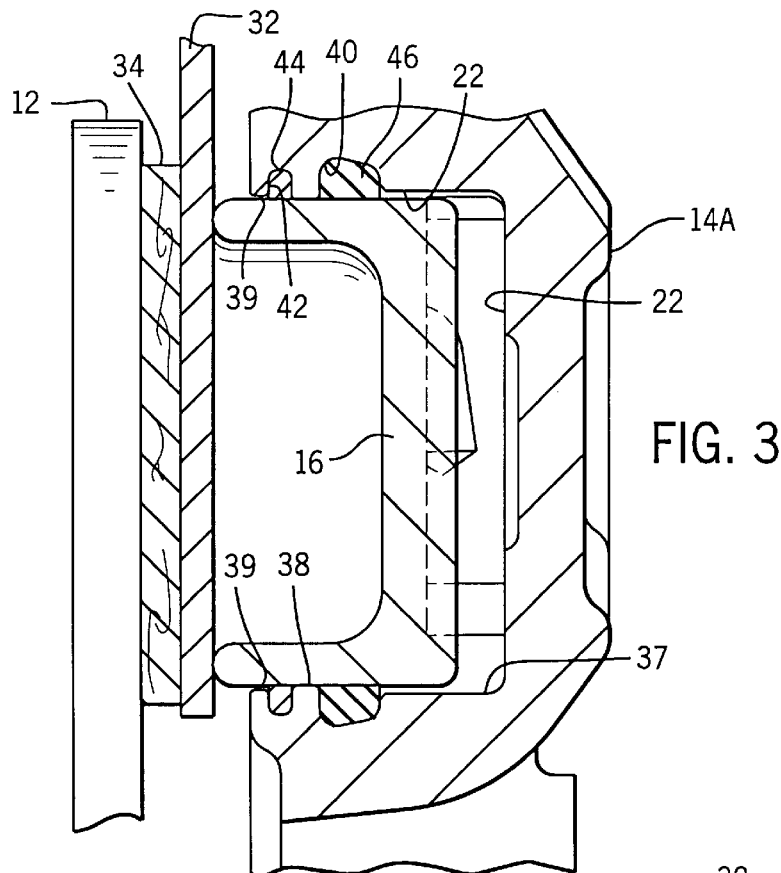
FIG. 3 is a cross section view of the modified piston bore according to the present invention which includes an internal flange designed to prevent jamming of the piston in the bore.
Figure 4:
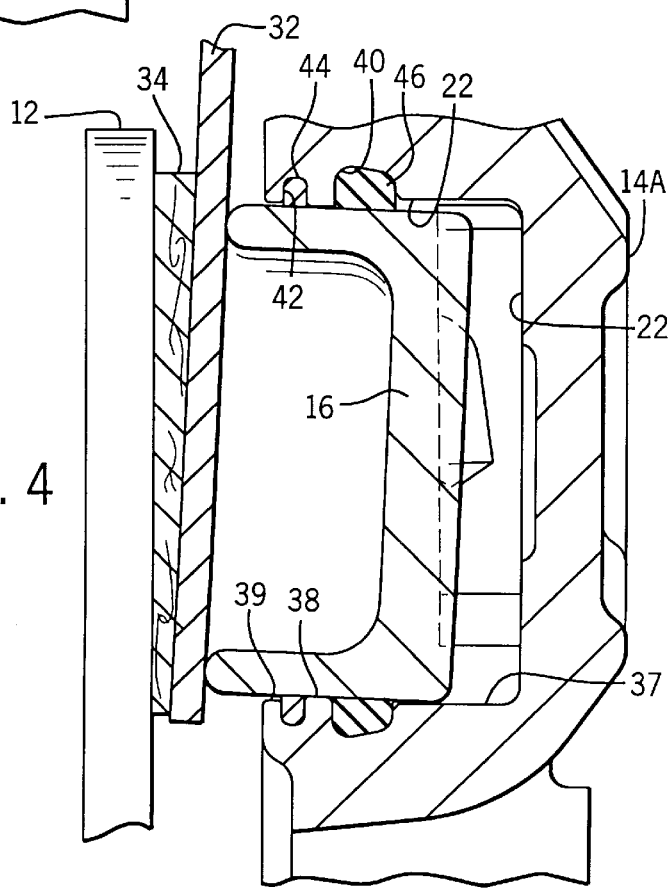
FIG. 4 is a view of the modified piston bore shown axially offset from the bore due to tapered pad wear.

As shown in FIGS. 3 and 4, each cylinder or bore 22 includes a main inner bore 37 having a predetermined depth. An internal flange 38 having a diameter smaller than the bore 37 is located at the end of the main bore 37. A secondary bore 39 is provided on the outer end of the bore 22 and having a diameter greater than the diameter of the flange 38. An annular groove 40 is provided in the bore 37 on the inner side of the flange 38 and a second groove 42 is provided in the secondary bore 39 on the outer side of the flange 38.

A wiper seal 44 is positioned in the groove 42. A piston seal 46 is positioned in the groove 40. It should be noted that the flange 38 which is located between the wiper seal groove 40 and the piston seal groove 42 has a diameter smaller than the diameter of the bore portions 37 and 39. The brake pad 34 shown in FIG. 3 is a new pad which is shown parallel to the face of the disk 12. The piston 16 is also axially aligned with the flange 38 in the bore 37. The brake pad 34 in FIG. 4 is shown worn on one side such that the plate 32 is angularly offset from the disk 12. The piston 16 is also shown offset from the axes of the bores 37 and 39.

Figure 5:
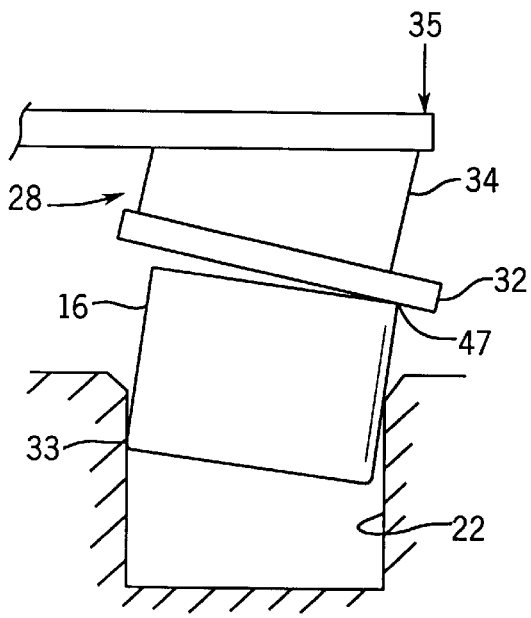
FIG. 5 is a schematic view of a worn brake pad with a piston shown cocked in a conventional bore.
Figure 6:
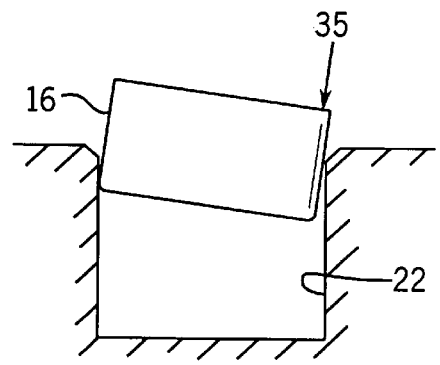
FIG. 6 is a schematic view similar to FIG. 3 showing the pressure point of a cocked piston in a conventional bore.
Figure 7:
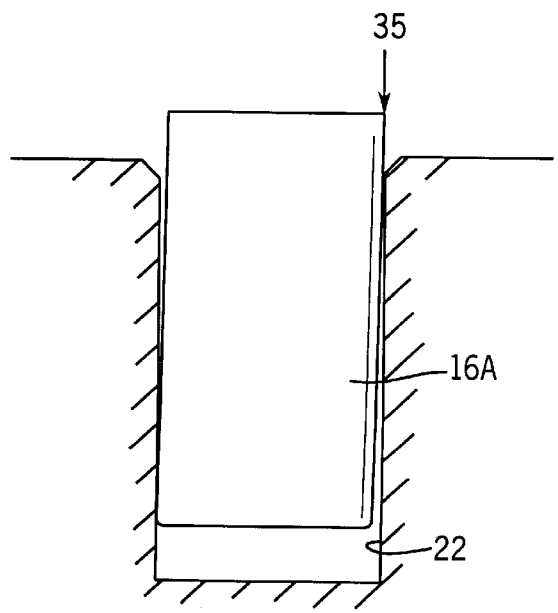
FIG. 7 is a view of the pressure point of the elongated piston in a conventional bore.

Referring to FIG. 5, an exaggerated representation of a worn brake pad assembly 28 is shown wherein the brake pad 34 is worn creating an unbalanced force 35 on the edge of the piston 16. The inner opposite edge 33 of the piston 16 is shown jammed into the side of the bore 22, as shown in FIG. 5. In this regard, the brake pad assembly 28 is shown in a worn condition with the brake plate 32 bearing down on the corner 47 of the piston 16. Eventually the piston will jam in the bore 22 as shown in FIG. 6. This condition can be obviated by lengthening the piston 16A as shown in FIG. 7. However, this would require a longer piston and bore arrangement which would be impractical in most applications where space is limited.

Figure 8:
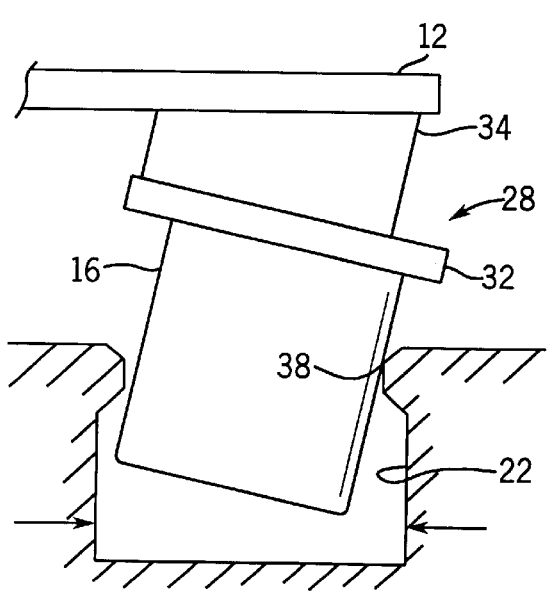
FIG. 8 is a schematic view of the piston shown cocked on the flange of the improved design without cross corner contact.

Referring to FIG. 8, an exaggerated representation of the same conditions on the piston 16 in the bore arrangement according to the present invention. The piston 16 is shown cocked on the flange 38 in the bore 22. With this arrangement the piston 16 can be cocked at a greater angle on the flange 38 than necessary to compensate for the angular wear of the brake pads and thereby preventing jamming of the piston in the cylinder.

Thus, it should be apparent that there has been provided in accordance with the present invention a ball joint piston bore caliper that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

What is claimed is:

1. A disk brake assembly comprising:
   a rotary disk having a pair of side surfaces,
   a caliper having side wall sections located on both sides of the disk so as to face the side surfaces of said disk,
   a brake pad disposed between each of said side wall sections of said caliper and said disk, each of said brake pads being susceptible to angular wear,
   a cylinder provided in each of said side wall sections of said caliper, and
   a piston slidably mounted in each of said cylinders, each of said cylinders including a first bore having a diameter greater than the diameter of the piston, each of said first bores having a side surface, and
   a flange having a diameter corresponding to but slightly greater than the diameter of each of said pistons for slidably supporting each of said pistons in each of said cylinders, the diameter of each of said first bores being greater than the diameter of each of said flanges so as to allow each of said pistons to be cocked on each of said flanges in response to angular wear of each of said brake pads,
   wherein, when each of said pistons is cocked on each of said flanges, each of said pistons is prevented from being jammed in each of said cylinders.

2. The disk brake assembly according to claim 1 including a second bore on the outer end of each of said cylinders having a diameter greater than the diameter of each of said flanges.

3. The disk brake assembly according to claim 2 further including a piston seal mounted in a first groove in each of said first bores on the inner side of each of said flanges and a wiper seal mounted in a second groove in each of said second bores on the outer side of each of said flanges.

4. The disk brake assembly according to claim 1 wherein, when each of said pistons is cocked on each of said flanges, each of said pistons is not jammed into the side surface of each of said first bores.

5. The disk brake assembly according to claim 4 wherein, when each of said pistons is cocked on each of said flanges, each of said pistons is also not jammed into a side surface of said flange.

6. A disk brake assembly, comprising:
   a rotary disk having a pair of side surfaces,
   a caliper having side wall sections located on both sides of said disk so as to face the side surfaces of said disk,
   a brake pad disposed between each of said side wall sections of said caliper and said disk, each of said brake pads being susceptible to angular wear,
   at least one of said side wall sections of said caliper having a cylinder, a piston slidably mounted in said cylinder and a flange, said cylinder having a main inner bore having a diameter, a predetermined depth, and a side surface, said piston having a diameter less than the diameter of the main inner bore, said flange having a diameter greater than the diameter of said piston for slidably supporting said piston in said cylinder, the diameter of the main inner bore being greater than the diameter of said flange to allow said piston to pivot on said flange in response to angular wear of said associated brake pad without contacting the side surface of the main inner bore.

7. The disk brake assembly according to claim 6 wherein said cylinder has an outer bore on the opposite side of said flange as the main inner bore, the outer bore having a side surface and a diameter greater than the diameter of said flange to allow said piston to pivot on said flange in response to angular wear of said associated brake pad without contacting the side surface of the outer bore.

8. The disk brake assembly according to claim 7 wherein said outer bore has an outer annular groove, further comprising a wiper seal mounted within the outer annular groove.

9. The disk brake assembly according to claim 6 wherein both side wall sections allow said pistons to pivot on said flanges in response to angular wear of said associated brake pads without contacting the side surfaces of the main inner bores.

10. The disk brake assembly according to claim 9 wherein, when said pistons pivot on said flanges in response to angular wear of said associated brake pads, said pistons also are not jammed into side surfaces of said flanges.

11. The disk brake assembly according to claim 6 wherein said main inner bore has an inner annular groove, further comprising a piston seal mounted within the inner annular groove.

12. The disk brake assembly according to claim 6 wherein, when said piston pivots on said flange in response to angular wear of said associated brake pad, said piston also is not jammed into a side surface of said flange.

13. A disk brake assembly for controlling a rotating brake disk, said assembly comprising a caliper having side wall sections provided on each side of the brake disk,
   a brake pad disposed between each of said sections of said caliper and said disk, a cylinder in each of said side wall sections of said caliper,
   a piston slidably received in each of the cylinders for pressing the brake pads into engagement with the sides of the disk, each of said cylinders including a main bore, a flange at the end of the main bore having a diameter smaller than the diameter of said main bore, said piston being aligned with said flange in a spaced relation to said main bore, a groove in the main bore on the inward side of the flange, a seal ring seated in the groove in the main bore, and secondary bore on the outer end of said cylinder having a diameter greater than the diameter of the main bore, a secondary groove in the secondary bore on the outward side of the flange and a wiper ring seated in said secondary groove.

* * * * *

UNITED STATES PATENT AND TRADEMARK OFFICE
CERTIFICATE OF CORRECTION

PATENT NO. : 5,964,321
DATED : October 12, 1999
INVENTOR(S) : George H. Hinkens

It is certified that error appears in the above-indentified patent and that said Letters Patent is hereby corrected as shown below:

In claim 13, column 6, line 1, insert --a-- at the beginning of the sentence before "secondary".

Signed and Sealed this

Fourth Day of April, 2000

Attest:

Attesting Officer

Q. TODD DICKINSON

Director of Patents and Trademarks